United States Patent [19]

Morse

[11] 3,831,184
[45] Aug. 20, 1974

[54] SELF-TIMER ATTACHMENT FOR CAMERA
[75] Inventor: John B. Morse, Boston, Mass.
[73] Assignee: Polaroid Corporation, Cambridge, Mass.
[22] Filed: Jan. 2, 1974
[21] Appl. No.: 429,899

[52] U.S. Cl. .............................. 354/240, 354/267
[51] Int. Cl. .......................................... G03b 17/40
[58] Field of Search .......... 354/237, 239, 240, 266, 354/267

[56] References Cited
UNITED STATES PATENTS
3,154,951  11/1964  Vuilleumier et al. ........... 354/239 X
3,350,992  11/1967  Stamp et al. ...................... 354/240

Primary Examiner—Joseph F. Peters, Jr.
Attorney, Agent, or Firm—Alfred E. Corrigan

[57] ABSTRACT

A self-timing accessory having a casing configuration adapted for connection directly to the shutter housing of cameras particularly of the type in which an automatic electronic shutter supported in the shutter housing is actuated by depression of an exposure initiating actuator presented on one face of the shutter housing. The casing is designed to be secured by frictional engagement with opposed exterior surfaces on the shutter housing and is equipped with a timing mechanism operable after a time delay interval to depress and release the exposure initiating actuator thereby to avoid a drain on the electric power supply of the camera as a result of retention of the actuator in a depressed condition.

12 Claims, 12 Drawing Figures

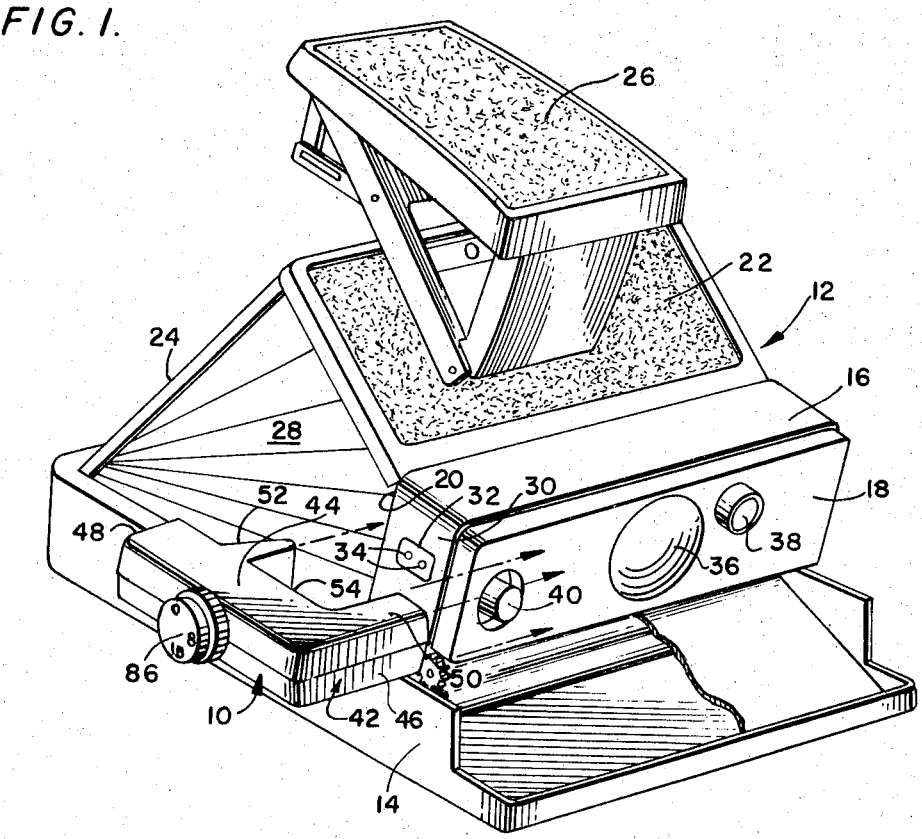
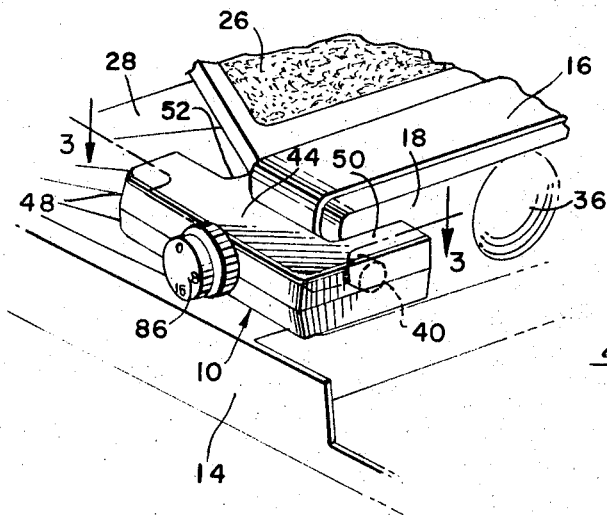
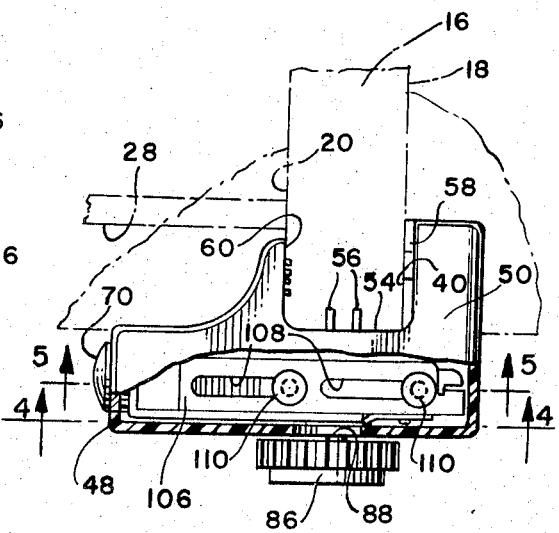

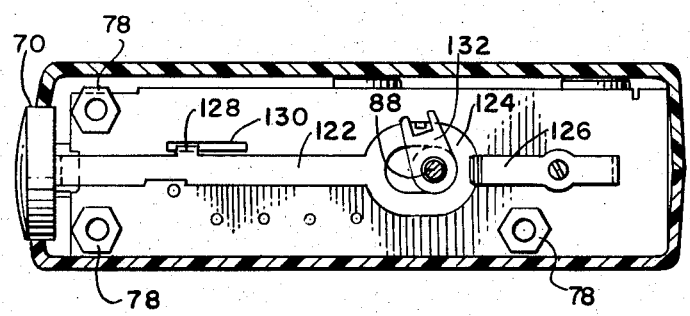
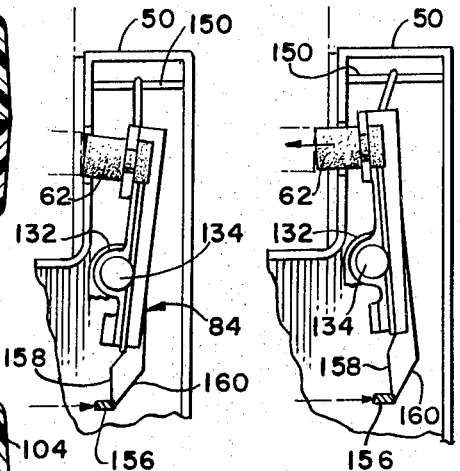
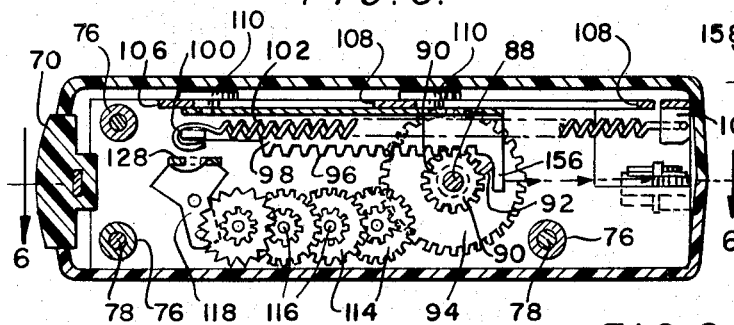
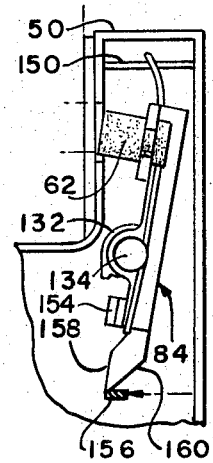
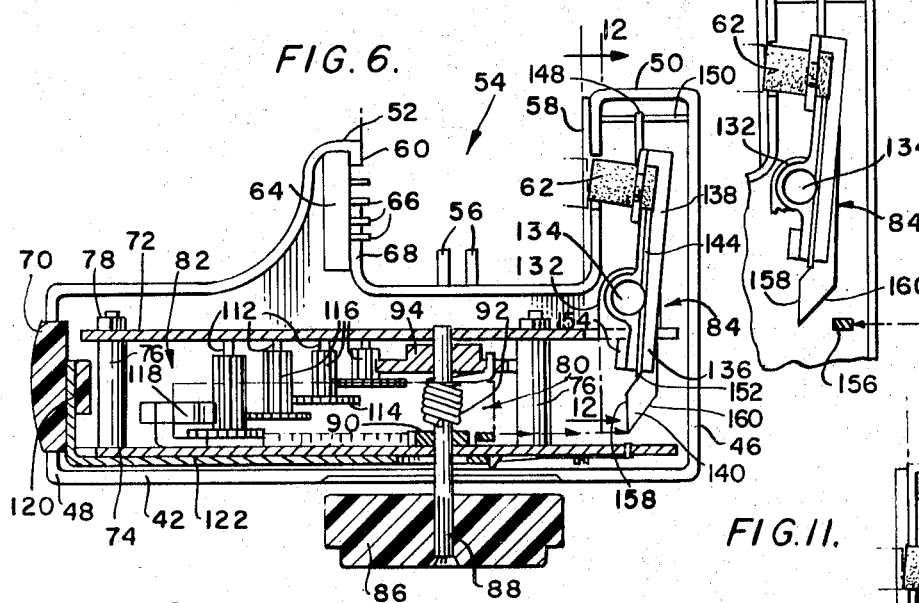
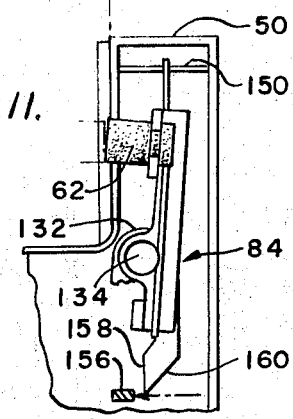
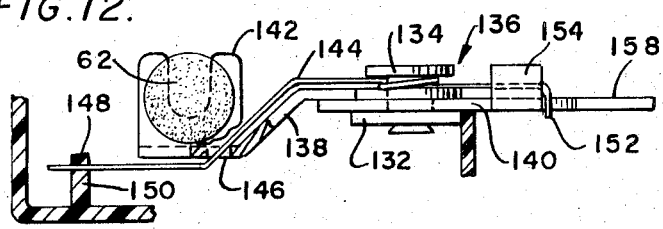

SELF-TIMER ATTACHMENT FOR CAMERA

BACKGROUND OF THE INVENTION

This invention relates to self-timing actuating mechanisms for photographic cameras and more particularly, it concerns a self-timing accessory unit adapted to be releasably attached to a single lens reflex camera having an automatic electronic shutter to impose a preestablished time delay between manual initiating action and initiation of an exposure cycle.

Single lens reflex cameras are well-known in the photographic art and are widely accepted because of the facility they offer for viewing the object or scene to be photographed through the same lens by which an image of that object or scene is formed at the film plane of the camera. The accommodation in a single lens for both viewing and imaging is provided most commonly by a hinged mirror initially positioned behind the objective lens and oriented to reflect an image of the object or scene to a viewing eyepiece. The mirror is operably connected to the shutter actuating mechanism of the camera so that it will swing out of the optical path between the objective lens and the film plane as the shutter is released. Traditionally, single lens reflex cameras have been used with relatively small film formats, for example, 24mm by 36mm, so that the mirror, which approximates the film format, is easily moved between viewing and exposure modes by a linkage interconnection with the shutter actuating button.

Single lens cameras commonly incorporate a self-timing mechanism for imposing a delay between manual initiation of the mechanism and actual shutter release. One obvious advantage of such a time delay is that it enables an operator to establish a field of view, initiate the self-timing mechanism and then move within the field of view to achieve a self portrait. The self-timing mechanism is also useful in photographic situations where scene light requires a relatively slow shutter speed, thus giving rise to the possibility of objectionable camera movement during exposure. In such situations, the self-timing mechanism may be used so that at the instant the shutter is actuated for film exposure, no movement of the camera will occur as a result of manual depression of the shutter actuating button. Also, the time delay enables a photographer to hold the camera in relatively rigid fashion at the instant of exposure to eliminate or reduce vibrations which may result from rapid movement of the reflex mirror.

Recent developments in single lens reflex cameras have included relatively large format single lens reflex cameras which are electrically powered and electronically controlled to effect a complete photographic cycle (film exposure, development and ejection from the camera) automatically upon depression of a single pushbutton actuator. Exemplary disclosures of such large format automated single lens reflex cameras are found in U.S. Pat. No. 3,672,281 issued June 27, 1972 to Edwin H. Land, U.S. Pat. No. 3,714,879 issued Feb. 6, 1973 to Edwin H. Land et al, and U.S. Pat. No. 3,766,842 issued Oct. 23, 1973 to James M. Whall, all of which patents are assigned to the assignee of the present invention. In addition to possessing such features as a relatively large film format, automated operation and single lens reflex operation, such cameras are designed to be extremely compact for carrying convenience. To achieve overall compactness and smallness of size for convenience of carrying, the cameras employ a foldable body in which a light-type bellows is flexibly connected behind a pivotal shutter housing movable from a collapsed position in which the lens is protected by the camera body to an erect operative position in which the lens is fully exposed to an object or scene to be photographed. The shutter housing also mounts a pushbutton actuator on its front face and houses the several components essential to fully automatic electronic shutter actuation.

Because of the relatively small and compact physical dimensions of the shutter housing, little space is afforded for the incorporation of a time delay mechanism as a built-in component. Moreover, any compromise in compactness for the physical accommodation of a built-in self-timing mechanism cannot be justified by the relatively specialized use of a self-timing mechanism.

SUMMARY OF THE PRESENT INVENTION

In accordance with the present invention, there is provided a self-timing accessory unit attachable directly to cameras of the type having a shutter housing and in which the pushbutton exposure cycle initiator is mounted on one face of the shutter housing. Essentially, the self-timing accessory in accordance with the present invention incorporates a unitary casing having a configuration such that it may be attached about one side edge of the camera shutter housing and in a position to overlie the actuating button of the camera. The accessory incorporates a manually wound timed delay mechanism having its own pushbutton release to enable initiation of a time delay actuating cycle. The accessory also is equipped with an output plunger capable of depressing the camera pushbutton actuator and then releasing the camera pushbutton after actuation so as to avoid any possibility of unnecessary power drain on the electrical system of the camera.

Among the objects of the present invention are: the provision of a self-timer accessory unit for photographic cameras; the provision of such an accessory unit which is readily adaptable to single lens reflex cameras of the type incorporating a shutter housing forming part of a foldable camera body; the provision of such a self-timing accessory unit which is easily and positively affixed to the camera with which it is used; the provision of such a self-timing accessory which operates to depress and release a camera pushbutton to initiate an exposure cycle; and the provision of such a self-timing accessory which is compact, capable of rough handling without damage and easy to affix and operate on a camera with which it is used.

Other objects and further scope of applicability of the present invention will become apparent from the detailed description to follow taken in connection with the accompanying drawings in which like reference numerals designate like parts.

BRIEF DESCRIPTION OF THE DRAWINGS

FIG. 1 is a perspective view of a large format single lens reflex camera with the self-timing accessory unit of the present invention in position to be mounted on the camera;

FIG. 2 is a fragmentary perspective view similar to FIG. 1 but with the accessory unit of the present invention in place;

FIG. 3 is an enlarged plan view of the self-timing accessory unit in accordance with the present invention partially cut-away to illustrate internal operating components;

FIG. 4 is an enlarged cross-section taken on line 4—4 of FIG. 3;

FIG. 5 is an enlarged cross-section taken on line 5—5 of FIG. 3;

FIG. 6 is a cross-section taken on line 6—6 of FIG. 5;

FIGS. 7–11 are fragmentary cross-sections similar to FIG. 6 but illustrating the pushbutton actuating plunger assembly of the self-timing actuator in different operating positions; and FIG. 12 is an enlarged fragmentary cross-section taken on line 12—12 of FIG. 6.

DETAILED DESCRIPTION OF THE PREFERRED EMBODIMENT

In FIGS. 1-3 of the drawings, the self-timing accessory unit of the present invention is designated generally by the reference numeral 10 and positioned relative to an automated single lens reflex camera 12. Although the camera 12 is fully described in the above-mentioned U.S. patents, it will suffice for purposes of a clear understanding of the accessory unit 10 to note that the camera body structure is constituted by a base 14 of tray-like configuration and mounting near its forward end a pivotally mounted shutter housing 16 having oppositely facing exterior front and rear faces 18 and 20, respectively. The camera body is further constituted by a forward upper wall 22 hinged at its forward edge to the upper portion of the rear surface of the shutter housing 16. The rear edge of the forward wall 22 is similarly hinged to the front edge of a rear upper wall 24 in turn hinged at its rear edge to the base 14. A viewing assembly 26 is collapsibly mounted on the forward upper wall 22 and an accordian bellows 28 provides a lighttight film and mirror compartment between the base 14, the rear of the shutter housing 16 and the upper walls 22 and 24.

The exterior configuration of the shutter housing 16 is thus essentially a rectangular parallelepiped supporting in an end wall 30, an electrical receptacle 32 having a pair of female terminals 34 for connection of various electrical accessories. Presented at the front face 18 of the housing 16 is the camera objective lens 36, a photocell entrance assembly 38 and a pushbutton actuator 40 positioned near the end wall 30 in which the receptacle 32 is mounted. Button 40 is part of a normally open switch in an exposure circuit and is adapted to be depressed to initiate an exposure cycle upon closing the switch and to return to its normally open position upon release of the depressing force.

The illustrated components of the camera 12 are shown in an erected or operative position though it will be appreciated particularly by reference to the aforementioned U.S. patents that these components fold into a relatively thin flat configuration of a size by which the entire camera may be carried conveniently in the pocket of a garment, for example. Also, it is to be noted that although in the erected or operative condition shown, the lens 36 as well as the pushbutton 40 are positioned for clear access to initiate a picture taking or complete photographic cycle, when folded, the lens 36, the pushbutton 40 as well as the photocell entrance assembly 38 move downwardly and forwardly against the base 14 so as to be fully protected during periods of non-use.

The camera is used in its erected condition as shown by observing the object or scene to be photographed as a light image passed through the objective lens 36 and reflected to the view finder 26. After viewing, the button 40 is depressed and released to initiate an exposure cycle which involves movement of a reflex mirror (not shown) within the bellows 28, and exposure of a film unit followed by processing of the film unit and discharge thereof forwardly of the base 14. The manner in which this automated and complete photographic cycle is carried out is fully disclosed in the aforementioned U.S. patents. Hence, further discussion of the camera operation, in itself, is unnecessary to a complete understanding of the present invention except to note that it is important that the button 40 be depressed and released inasmuch as while the button is depressed, a power drain is imposed on the electrical system of the camera.

The self-timing accessory unit 10 includes an outer rigid casing 42 of a configuration to define a base portion 44 having front and rear ends 46 and 48, respectively, and first and second leg portions 50 and 52 projecting from one side thereof to define a generally U-shaped cavity 54. The base of the U-shaped cavity 54 bears against the side 30 of the shutter housing 16 and includes a two prong non-conductive male terminal 56 which mates with the female receptacle 32 to position the timing unit on the shutter housing. The first and second upright legs 50 and 52 defining the U-shaped cavity include mutually facing inner walls 58 and 60 which bear against a portion of both front and rear exterior surfaces 18 and 20 of the shutter housing 16 and are spaced apart to snugly accommodate the front and rear surfaces of the shutter housing.

The first projecting leg 50 includes on the inner wall 58 a recessed plunger 62 which is aligned with the shutter release button 40 on the front surface of the shutter housing 16 of the camera 12 when the timing unit is attached thereto as shown in FIGS. 2 and 3 of the drawings. A plate 64 having a plurality of small fingers 66 projecting therefrom (FIG. 6) is attached in a recess 68 centrally located on the inner wall 60 of the second projecting leg 52 such that tips of the fingers protrude slightly above the surface of the inner wall 60. When the timing unit is attached to the camera, the tips of the fingers flex against the rear surface of the shutter housing. The compressed fingers provide a high friction-bearing surface which prevents the timing unit 10 from sliding away from the shutter housing 16 once attached thereto and maintains proper alignment of the recessed plunger 62 on the first projecting leg 50 with the button 40 of the camera.

A timing actuator button 70 is presented at the rear end 48 of the plastic case 42 to initiate a timing cycle by releasing a latch internal timing mechanism to be described below in detail. When the timing cycle is completed, aligned plunger 62 is advanced in the direction of the button 40 of the camera to initiate an exposure cycle. The plunger 60 depresses the button for a limited period, 0.3 second minimum to 1 second maximum, thereby preventing the draining of a battery supplying energy to the automatic electronic shutter, while insuring proper operation of the circuit.

As shown most clearly in FIGS. 3–6 of the drawings, an internal timing mechanism is housed within the casing 42 and supported on a frame established by a pair of generally parallel side plates 72 and 74 secured against the end of spacing collars 76 by screw bolts 78. The frame plates 72 and 74 in their assembled condition are dimensioned to fit within the base portion 44 of the casing 42 essentially as shown. The timing mechanism supported by the frame plates 72 and 74 is formed by three major sub-assemblies, namely, a winding assembly 80, a timing assembly 82 and a firing assembly generally designated by the reference numeral 84. The winding assembly includes an exterior winding knob 86 (having suitable timing indicia thereon) splined or otherwise non-rotatably secured to the end of a winding shaft 88 journaled for rotation in the frame plates 72 and 74. In axially spaced positions along the shaft 88 proceeding from the winding knob 86 as shown in FIG. 6, the shaft 88 supports a pinion gear 90 rigidly attached for rotation with the shaft, a spring clutch 92 wound about the shaft behind the pinion gear, and a power gear 94 independently centered about the shaft between the clutch 92 and the frame plate 72. The pinion gear 90 is positioned to mesh with a rack gear 96 integrally including a base 98 having one end 100 attached to one end of a power spring 102 positioned parallel with the rack gear. The other end of the power spring 102 is hooked into an upright member 104 provided on frame plate 74. As shown in FIGS. 3 and 5, the frame plate 74 is formed with a right angle flange 106 having elongated slots 108 which cooperate with a pair of rivets 110 attached to the base 98 of the rack gear 96 to provide a slide mechanism whereby each shank of the rivets 110 travel in linear motion within each slot 108. When the wind knob 86 is rotated in the counterclockwise direction, the shaft 88 rotates the pinion gear 90 driving the rack gear 96 having the power spring 102 attached until the rivets 110 are in a terminal position in the elongated slots 108. The power spring 102 is loaded with potential energy having been placed in tension by the travel of the rack gear 96. The spring clutch 92 is attached to the power gear 94 through an eccentric hole provided for such purpose in the power gear as shown in FIG. 6. When the wind knob is rotated counterclockwise to wind the mechanism, the clutch spring 92 is relaxed on the shaft so that the clutch and the power gear 94 are allowed to slip free of the shaft. The power gear, therefore, will not rotate during the counterclockwise winding rotation of the shaft 88.

The timing assembly 82 includes a series of parallel shafts 112 having opposite ends journaled in the frame plates 72 and 74. Each parallel shaft 112 includes a large drive gear 114 and a small driven gear 116 driven by the drive gear on the previous shaft, thereby providing a gear train having a large speed reduction. The last parallel shaft in the series drives an oscillating inertial mass 118 commonly referred to as a "Verge" which oscillates until the timing mechanism is unwound. The driven gear of the first parallel shaft in the series mates with the power gear 94 which supplies power to the gear train and the mass 118 in a manner to be described below.

It is to be noted that the pushbutton 70 is supported on an inwardly directed leg 120 of a generally L-shaped slide, the other longer leg 122 of which extends along the outer side of the frame member 74 and terminates in an enlarged slotted portion 124 as shown most clearly in FIG. 4 of the drawings. The slotted portion 124 is supported by the shaft 88 for limited movement between an enabled position as shown in FIG. 4 and a timer initiating position. A leaf spring 126 secured to the outside of the frame plate 74 retains the leg 122 against the outer surface of the frame plate. The leg 122 is provided with an inwardly directed tang 128 which projects through a slot 130 in the frame plate 74 so that when the pushbutton 70 is in its retracted or enabling position, the tang 128 engages an arm of the inertial mass 118 to hold it against oscillating or timing movement. The relative position of the tab 128 and the inertial mass in this position is shown in FIG. 5 of the drawing. Also, movement of the pushbutton 70 to its retracted position, after a timing cycle, is effected by a yoke 132 coupled with the rewind knob by a light coil spring 134 (FIG. 3) so that the pushbutton will be enabled automatically upon winding the timing mechanism and tensioning the power spring 102. When the timer actuating button is depressed after the mechanism is wound by rotating the knob 86 in a counterclockwise direction, the tab 128 releases the inertia member as well as the energy stored in the power spring causing the rack gear 96 to rotate the pinion gear 90 and the shaft 88 in a reverse or clockwise direction. Because of the manner in which the spring clutch 92 is wound about the shaft 88, such clockwise rotation of the shaft will cause the spring to exert a gripping action on the shaft and transmit torque from the shaft to the power gear 94. Because of the gear train driven by the power gear as well as the inertial member 118, a timed duration of approximately 8 to 15 seconds will be required for the rack to advance such that the rivets 110 approach the other end of the slots 98 to actuate the firing assembly in a manner described below.

The firing assembly 84 is supported on a right angle tab 132 struck out from the frame plate 72 in the direction of the first casing leg portion 50. The tab 132 supports an upstanding pintle or rivet 134 on which a two-part lever assembly 136 is pivoted. As shown most clearly in FIGS. 6 and 12 of the drawings, the lever assembly 136 includes a pair of arms 138 and 140 independently pivoted about the axis of the pintle 134. The arm 138 is provided with an upstanding U-shaped bracket to engage in the necked-down portion of the timer plunger 62. A spring wire 144 is wrapped about the pivot 134 and extends in one direction toward the plunger 62 through an aperture 146 in the lever arm 138 and then outwardly such that the distal end thereof is engaged in a slot 148 in an integral rib 150 formed in the casing leg portion 50. The other end of the spring wire 144, upon leaving the wrap about the pivot 134 extends outwardly over the arm 138 and downwardly to a hoop portion 152 engaging the forward face of the second lever arm 140. The arm 140 has at its forward face one-way abutment means in the form of an upstanding tab 154 which engages the forward face of the first-mentioned lever arm 138. Thus, appropriate stressing of the spring in its wrap about the pivot 134 will hold the two arms 138 and 140 so that the tab 154 on the arm 140 is engaged by the arm 138. Further, the location of the slot 148 in the casing is located so that the spring wire 144 will retain the plunger in an initial or inactive position essentially as shown in FIGS. 7, 9 and 11 of the drawings.

The forward end of the rack 96 is formed with a depending tang or striker 156 positioned to engage the arm 140 near the end of a striking face 158 thereon as the rack moves in a timing cycle such that the rivets 110 approach the end of the slots 108 as described above. The end portion of the arm 140 opposite the striker face 158 is provided with an inclined surface 160.

The operation of the firing assembly and the operation of the self-timing accessory unit may now be understood by reference particularly to FIGS. 7–11 of the drawings. As shown in FIG. 7, the striker 156 on the rack 96 is approaching the face 158 of the arm 140 near the end of a timing cycle. Continued movement of the striker in the direction of the face 158 will pivot the lever arm assembly 136 to the position shown in FIG. 8 at which the timer plunger 62 will engage and depress the release button 40 on the camera 12. At the end of its travel, the striker will pass beyond the end of the lever arm, for example, to the position shown in FIG. 9, so that the projecting end of the wire 140 engaged in the slot 148 will cause the lever assembly to return to its initial position releasing the shutter release button on the camera. When the rack is returned to its wound position for the initiation of a succeeding timing cycle, the striker 156 will engage the beveled surface 160 on the rear of the lever arm 140 and pivot the lever assembly such that the tab 154 on the arm 140 is drawn forwardly of the front surface of the arm 138 to again stress the wire spring 144. This relative movement of the two lever arms 138 and 140 will allow the striker to move past the end of the lever arm assembly without imposing a load on the components of the mechanism.

Thus, it will be seen that by this invention there is provided a compact easily attached and highly effective self-timing accessory unit for cameras particularly of the type described and by which the above-mentioned objectives are completely fulfilled. It is contemplated that with minor modifications in the configuration of the casing 44, the accessory may be adapted equally as well to cameras having different body configurations and especially such cameras employing an electric power source in which depression of the exposure initiating actuator followed by a release thereof is important from the standpoint of avoiding an unnecessary drain on that power source. Because such changes and others in the embodiment disclosed will be apparent to those skilled in the art without departure from the present invention, it is expressly intended that the foregoing description is illustrative of a preferred embodiment only, not limiting, and that the true spirit and scope of the present invention be determined by reference to the appended claims.

What is claimed is:

1. A self-timing accessory unit attachable to photographic cameras having an exposure initiating actuator presented at one of two oppositely facing exterior camera body surfaces, said unit comprising:

a casing having a body portion and a pair of leg portions projecting therefrom, said leg portions having mutually facing surfaces spaced to fit snugly over the oppositely facing exterior camera body surfaces so that one of said leg portions overlies the exposure initiating actuator;

a timing mechanism contained in said casing and having a firing assembly including a plunger positioned in said one leg portion for movement between a retracted position and an extended position in which it engages and depresses the exposure initiating actuator; and said timing mechanism including means operable after a timed delay interval to move said plunger automatically from said retracted position to said extended position and back to said retracted position.

2. The apparatus as recited in claim 1 wherein said firing assembly includes centrally pivoted lever means supporting said plunger at one end and having a striker face at the other end, said operable means including a movable striker adapted to engage said striker face to pivot said lever means to move said plunger from said retracted to said extended position.

3. The apparatus recited in claim 2 wherein said striker is supported for movement in a linear path whereby after engagement with said striker face and movement of said other end in an arcuate pivotal path, said striker disengages said striker face, and said operable means includes spring means for returning said lever means and said plunger to said retracted position.

4. The apparatus recited in claim 2 wherein said lever means includes first and second independently pivotal arms, said first arm extending to said one end to support said plunger, said second arm extending to said other end and having said striker face formed thereon, said second arm also having one-way abutment means for engaging and pivoting said first arm during engagement of said striker with said striker face.

5. The apparatus recited in claim 4 wherein said operable means includes spring means comprising a one-piece spring wire operable to hold said one-way abutment against said first arm and to bias said lever means to said retracted position.

6. The apparatus recited in claim 5 wherein said one-piece spring wire is wrapped about said pivot and extends along said first arm, through an aperture formed therein and to a distal or free end anchored in said casing and extends in the other direction to engage the second arm to bias said one-way abutment thereon into engagement with said first arm.

7. The apparatus recited in claim 1 wherein said other leg of said casing supports at said facing surface thereof resilient friction means for retaining the accessory unit to the camera.

8. The apparatus recited in claim 7 wherein said friction means comprises a molded plate assembly having upstanding resilient fingers deflectable in a direction opposite to that which the accessory unit is attached to the camera.

9. The apparatus recited in claim 1 wherein said timing mechanism includes a winding assembly and a manually actuated initiator rendered operable upon actuation of said winding assembly to initiate a timing cycle.

10. An accessory for use with a camera of the type having a housing provided with a pair of oppositely facing exterior surfaces and an exposure initiating member presented at one of the exterior surfaces, said accessory unit comprising:

a casing having an external configuration to establish an essentially U-shaped cavity bounded by a base wall portion and a pair of mutually facing projecting wall portions spaced to detachably receive the oppositely facing exterior faces on the camera body shutter housing;

means on said base wall portion to position one of said mutually facing projecting wall portions to overlie the exposure initiating member; and a timing mechanism contained in said casing and having an output plunger in said one wall portion adapted to overlie and depress the exposure initiating member after a predetermined time delay interval.

11. The apparatus recited in claim 10 wherein the housing supports a female receptacle in an exterior wall between said oppositely facing exterior surfaces, said casing having non-conductive positioning prongs projecting from said base wall portion and engageable in said receptacle to locate said accessory unit on the camera.

12. The apparatus defined in claim 10 further including resilient means mounted on one of said wall portions for frictionally securing said accessory unit on the housing.

* * * * *